(12) United States Patent
Simmons

(10) Patent No.: US 6,545,984 B1
(45) Date of Patent: Apr. 8, 2003

(54) METHOD FOR TOPOLOGY ANALYSIS IN THE VERIFICATION OF NEIGHBOR AND TARGET LISTS IN A CDMA NETWORK

(75) Inventor: Steven Michael Simmons, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/213,523

(22) Filed: Dec. 17, 1998

(51) Int. Cl.[7] ............................................... H04L 12/28
(52) U.S. Cl. ...................... 370/254; 370/252; 370/335; 370/342; 370/441; 455/456
(58) Field of Search ................................ 455/436, 437, 455/434, 515, 509, 456; 370/329, 252, 442, 335, 342, 254–258, 441

(56) References Cited

U.S. PATENT DOCUMENTS

| | | | | |
|---|---|---|---|---|
| 5,883,888 A | * | 3/1999 | St-Pierre ...................... 370/331 |
| 6,075,989 A | * | 6/2000 | Moore et al. ................ 455/436 |
| 6,119,005 A | * | 9/2000 | Smolik ........................ 455/436 |
| 6,167,269 A | * | 12/2000 | Kondo ........................ 455/437 |
| 6,173,181 B1 | * | 1/2001 | Losh ........................... 455/434 |

FOREIGN PATENT DOCUMENTS

EP          0 825 793 A1    2/1998

* cited by examiner

Primary Examiner—Hassan Kizou
Assistant Examiner—John Pezzlo
(74) Attorney, Agent, or Firm—John D. Crane; Bracewell & Patterson, L.L.P.

(57) ABSTRACT

A method for analyzing the topology of a CDMA network with respect to both neighbor and target lists is disclosed. The method first defines a language that creates an input source file for communicating the layout of the CDMA network. The language expresses the sector-neighbor list relationships of all sectors in the CDMA network. Next, the method parses and builds a directed graph from the input source file to perform topology analysis of the CDMA network. The method then analyzes the input source file and directed graph for possible errors in the network layout that will lead to dropped calls. The method renders a report to the user about those error conditions and emits a file to be used as input into the CDMA database.

23 Claims, 7 Drawing Sheets

Fig. 2

```
44 ─ /NCF7.0=KEY, MSCID_MKT, MSCID_SWNO, BSCID, CELLTYPE, CELLNAME, BAND, \
         CELLID, FREQUENCY, SECTOR, PILOT_PN, NEIGHBORLIST, EHHOTARGET, \
48 ─    BORDERTARGET, BEACONTARGET
   ─ /SBS=foo
/********************************************************************/
// This is an example of the DFW configuration.  Dallas contains 3 BTSs (8, 9, 10)
/********************************************************************/
// BTS 8 at Mockingbird and Central
54 // 
   // Key      MSCID  BSC  CellType       CellName    Band  Frq Sect. Pilot
50 // ----     Mkt Sw  ---  --------       --------    ----  --- ----- -----
   Dallas8Alpha  1  1  1  Cell_Standard  Mockingbrd  1900   8  325  Alpha 80 \
                               Dallas8Beta, Dallas8Gamma, \
                         Dallas9Alpha, Dallas9Beta, Dallas9Gamma, \
                         Dallas10Alpha, Dallas10Beta, Dallas10Gamma  * * *
   Dallas8Beta   1  1  1  Cell_Standard  Mockingbrd  1900   8  325  Beta 84 \
                         Dallas8Alpha,         Dallas8Gamma, \
                         Dallas9Alpha, Dallas9Beta, Dallas9Gamma, \
                         Dallas10Alpha, Dallas10Beta, Dallas10Gamma  * * *
50 Dallas8Gamma  1  1  1  Cell_Standard  Mockingbrd  1900   8  425  Gamma 88 \
                         Dallas8Gamma, \
                         Dallas9Alpha, Dallas9Beta, Dallas9Gamma, \
                         Dallas10Alpha, Dallas10Beta, Dallas10Gamma  * * *

42 // BTS 9 at I35 and Harry Hines
   //
   Dallas9Alpha  1  1  1  Cell_Standard  HarryHines  1900   9  325  Alpha 92 \
                         Dallas8Alpha, Dallas8Beta, Dallas8Gamma, \
                                Dallas9Beta, Dallas9Gamma, \
                         Dallas10Alpha, Dallas10Beta, Dallas10Gamma  * * *
50 Dallas9Beta   1  1  1  Cell_Standard  HarryHines  1900   9  325  Beta 96 \
                         Dallas8Alpha, Dallas8Beta, Dallas8Gamma, \
                         Dallas9Alpha,         Dallas9Gamma, \
                         Dallas10Alpha, Dallas10Beta, Dallas10Gamma  * * *
50 Dallas9Gamma  1  1  1  Cell_Standard  HarryHines  1900   9  325  Gamma 100 \
                         Dallas8Alpha, Dallas8Beta, Dallas8Gamma, \
                         Dallas9Alpha, Dallas9Beta, \
                         Dallas10Alpha, Dallas10Beta, Dallas10Gamma  * * *

// BTS 10 at Valley View and LBJ
50     //
   Dallas10Alpha 1  1  1  Cell_Standard  ValleyView  1900  10  325  Alpha 92 \
                         Dallas8Alpha, Dallas8Beta, Dallas8Gamma, \
                         Dallas9Alpha, Dallas9Beta, Dallas9Gamma, \
                                Dallas10Beta, Dallas10Gamma  * * *
   Dallas10Beta  1  1  1  Cell_Pilot_Beacon  ValleyView  1900  10  325  Beta 96  * * * \
                         92, Denton11Alpha, 84, FtWorth9Alpha
   Dallas10Gamma 1  1  1  Cell_Border    ValleyView  1900  10  325  Gamma 100 \
                         Dallas8Alpha, Dallas8Beta  *  FtWorth9Alpha  *

50 FtWorth9Alpha 1  1  1  Cell_Standard  Cowtown     1900   9  325  Alpha 92 * * * *
   Denton11Alpha 1  1  1  Cell_Standard  UNT         1900  11  125  Alpha 212
```

(46, 20, 52)

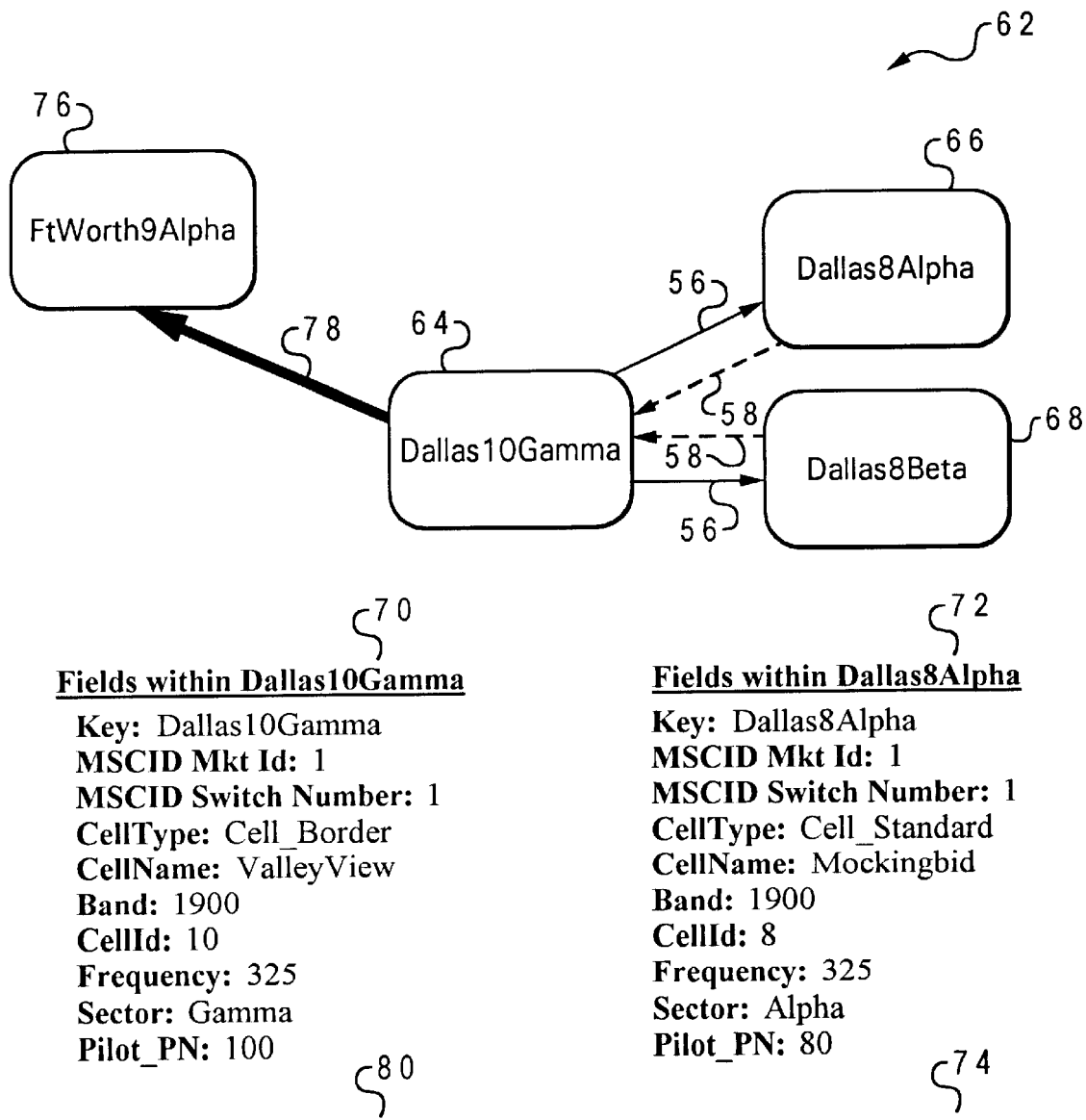

Fields within Dallas10Gamma
Key: Dallas10Gamma
MSCID Mkt Id: 1
MSCID Switch Number: 1
CellType: Cell_Border
CellName: ValleyView
Band: 1900
CellId: 10
Frequency: 325
Sector: Gamma
Pilot_PN: 100

Fields within Dallas8Alpha
Key: Dallas8Alpha
MSCID Mkt Id: 1
MSCID Switch Number: 1
CellType: Cell_Standard
CellName: Mockingbid
Band: 1900
CellId: 8
Frequency: 325
Sector: Alpha
Pilot_PN: 80

Fields within FortWorth9Alpha
Key: FortWorth9Alpha
MSCID Mkt Id: 1
MSCID Switch Number: 1
CellType: Cell_Standard
CellName: Mockingbid
Band: 1900
CellId: 9
Frequency: 325
Sector: Alpha
Pilot_PN: 80

Fields within Dallas8Beta
Key: Dallas8Alpha
MSCID Mkt Id: 1
MSCID Switch Number: 1
CellType: Cell_Standard
CellName: Mockingbid
Band: 1900
CellId: 8
Frequency: 325
Sector: Beta
Pilot_PN: 84

DALLAS8ALPHA (line 28) ------------------------
   WARN NEIGHBORLIST DALLAS8GAMMA does not have the same frequency
   WARN NEIGHBORLIST DALLAS9ALPHA and DALLAS10ALPHA have the same pilot pn
   WARN NEIGHBORLIST DALLAS9BETA and DALLAS10BETA have the same pilot pn
   WARN NEIGHBORLIST DALLAS9GAMMA and DALLAS10GAMMA have the same pilot pn DALLAS8BETA (line 34) ------------------------
   WARN NEIGHBORLIST DALLAS8GAMMA does not have the same frequency
   WARN NEIGHBORLIST DALLAS9GAMMA and DALLAS10GAMMA have the same pilot pn
   WARN NEIGHBORLIST DALLAS9BETA and DALLAS10BETA have the same pilot pn
   WARN NEIGHBORLIST DALLAS9ALPHA and DALLAS10ALPHA have the same pilot pn DALLAS8GAMMA (line 40) ------------------------
   WARN NEIGHBORLIST DALLAS10GAMMA does not have the same frequency
   WARN NEIGHBORLIST DALLAS10BETA does not have the same frequency
   WARN NEIGHBORLIST DALLAS10ALPHA does not have the same frequency
   WARN NEIGHBORLIST DALLAS9GAMMA and DALLAS10GAMMA have the same pilot pn
   WARN NEIGHBORLIST DALLAS9GAMMA does not have the same frequency
   WARN NEIGHBORLIST DALLAS9BETA does not have the same frequency
   WARN NEIGHBORLIST DALLAS9ALPHA and DALLAS10ALPHA have the same pilot pn
   WARN NEIGHBORLIST DALLAS9BETA and DALLAS10BETA have the same pilot pn
   WARN NEIGHBORLIST DALLAS9ALPHA does not have the same frequency
   WARN NEIGHBORLIST DALLAS8GAMMA in its own neighbor list
   INFO NEIGHBORLIST DALLAS8ALPHA (line 28) is not in list, but DALLAS8ALPHA does contain DALLAS8GAMMA in its list
   INFO NEIGHBORLIST Beta sector for this cell not in list
   INFO NEIGHBORLIST Alpha sector for this cell not in list
   INFO NEIGHBORLIST DALLAS8BETA (line 34) is not in list, but DALLAS8BETA does contain DALLAS8GAMMA in its list DALLAS9ALPHA (line 48) ------------------------
   WARN NEIGHBORLIST DALLAS10ALPHA has the same pilot pn
   WARN NEIGHBORLIST DALLAS9GAMMA and DALLAS10GAMMA have the same pilot pn
   WARN NEIGHBORLIST DALLAS9BETA and DALLAS10BETA have the same pilot pn
   WARN NEIGHBORLIST DALLAS8GAMMA does not have the same frequency DALLAS9BETA (line 54) ------------------------
   WARN NEIGHBORLIST DALLAS9ALPHA and DALLAS10ALPHA have the same pilot pn
   WARN NEIGHBORLIST DALLAS10BETA has the same pilot pn
   WARN NEIGHBORLIST DALLAS8GAMMA does not have the same frequency
   WARN NEIGHBORLIST DALLAS9GAMMA and DALLAS10GAMMA have the same pilot pn DALLAS9GAMMA (line 60) ------------------------
   WARN NEIGHBORLIST DALLAS10GAMMA has the same pilot pn
   WARN NEIGHBORLIST DALLAS8GAMMA does not have the same frequency
   WARN NEIGHBORLIST DALLAS9ALPHA and DALLAS10ALPHA have the same pilot pn
   WARN NEIGHBORLIST DALLAS9BETA and DALLAS10BETA have the same pilot pn

*Fig. 7*

METHOD FOR TOPOLOGY ANALYSIS IN THE VERIFICATION OF NEIGHBOR AND TARGET LISTS IN A CDMA NETWORK

BACKGROUND OF THE INVENTION

1. Technical Field

The present invention is directed to an improved method for verification of configuration network parameters in a CDMA network by use of topology analysis. Still more particularly the present invention relates to an improved method for maintaining signal connection when a mobile handset moves across a geographical area by performing topology analysis to sector; neighbor and target lists utilized in CDMA networks.

2. Description of the Related Art

Types of well-known prior art telecommunication systems are Code Division Multiple Access (CDMA) wireless networks. A mobile handset for use by a consumer communicates within the CDMA wireless network when it is located in a geographical region known as a coverage area. The mobile handset moves within the entire area and the network tracks this movement by dividing the coverage area into smaller regions referred to as cells. Cells may either be omni-sector (containing only one sector) or tri-sector (containing three sectors.) A handoff occurs when the mobile handset moves between different sectors in the coverage area. Additionally, the CDMA network internally maintains a database including target and neighbor lists for each sector for use in executing a handoff. These lists are the set of possible sectors into which a mobile handset in a given sector may handoff.

In use, a mobile handset originates in a serving sector. As the mobile handset moves across the geographical region, the serving sector must handoff into a target sector that serves the mobile handset better. There are currently three types of handoffs, namely, softer, soft and hard. The softer handoff is a handoff between two sectors that exist on the same cell wherein both sectors must operate at the same frequency and have common neighbor lists. The soft handoff is a handoff between two sectors that exist on different cells wherein both sectors must operate at the same frequency and the target is in the serving sector neighbor list. The hard handoff is a handoff between two sectors wherein the sectors are not necessarily the same frequency or technology. Hard handoffs are allowed only on certain sector types that triggers a handoff and hands the mobile unit into a sector from the target list (as opposed to the neighbor list).

Soft and softer handoffs are better than hard handoffs because the mobile handset makes the connection with the target sector before breaking with the serving sector. A hard handoff breaks connection with the serving sector before connecting with the target sector. Therefore, a phone call can survive a failed soft or softer handoff attempt than a hard handoff. However, an active phone call may drop if the target sector's attributes conflict with that of the serving sector. One reason these conflicts arise is when the system administrator does not properly configure the neighbor and target list information for placement in the CDMA database. Incorrect lists lead to failed handoffs causing the line of communication to drop or disconnect.

In view of the above, it should be apparent that a method which provides an automated process for catching many errors that may occur during configuration of neighbor and target lists would be highly desirable. This invention solves this problem in a novel and unique manner not previously known in the art.

SUMMARY OF THE INVENTION

It is therefore one object of the present invention to provide an improved method for verification of configuration network parameters in a CDMA network by use of topology analysis.

It is another object of the present invention to provide a method for analyzing an entire CDMA topology by building a directed graph for use in reducing errors that result in dropped calls.

It is yet another object of the present invention to provide an improved method for analyzing neighbor and target lists in a CDMA network for inconsistencies of frequency, band class and pilot value.

The foregoing objects are achieved as is now described. A method for analyzing the topology of a CDMA network with respect to both neighbor and target lists is disclosed. The method first defines a language that creates an input source file for communicating the layout of the CDMA network. The language expresses the sector-neighbor list relationships of all sectors in the CDMA network. Next, the method parses and builds a directed graph from the input source file to perform topology analysis of the CDMA network. The method then analyzes the input source file and directed graph for possible errors in the network layout that will lead to dropped calls. The method renders a report to the user about those error conditions and emits a file to be used as input into the CDMA network database.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is one example of an input source file for use with the method shown in FIG. 1;

FIG. 4 is a directed graph comparing targets and neighbor lists for inconsistencies;

FIG. 7 is an example of an output report using the method and source input file shown in FIG. 2 in accordance with the present invention.

DETAILED DESCRIPTION OF PREFERRED EMBODIMENT

Figure 1:
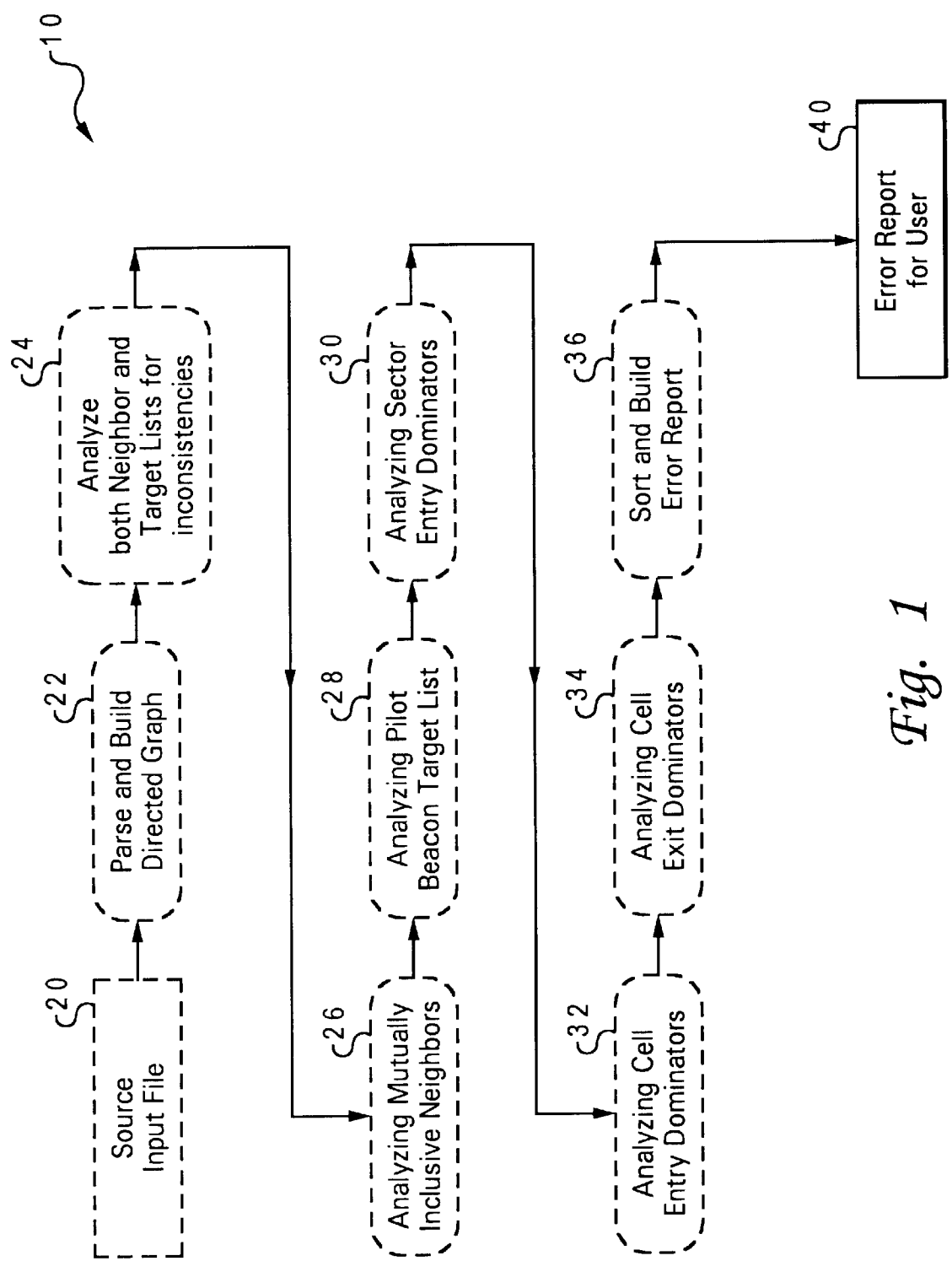
FIG. 1 is a high-level block diagram of a method for verification of configuration parameters in a CDMA network in accordance with the present invention.

With reference now to the figures and in particular with reference to FIG. 1, there is depicted a high-level block diagram of a method 10 for verification of configuration parameters in a CDMA network in accordance with the present invention. The method 10 is novel over prior art techniques by the addition of using both an input source file and a topology analyzer in verifying configuration parameters in a CDMA network. Referring once again to FIG. 1, the method starts by creating an input source file 20 that represents the layout of a CDMA network. The input source file 20 is then interpreted by a topology analyzer 22 wherein information is parsed, and stored internally as a directed graph 24.

The following forms of analysis are then done on the directed graph 24 to validate the directness of the input. This begins as shown in step 24, analysis of both neighbor and target lists for inconsistencies. Next, as shown in steps 26 and 28, analyzing mutually inclusive neighbor lists and a PILOT BEACON Target List. The final analysis performed by the method 10 of the present invention is analyzing sector entry, cell entry and cell exit dominators, shown in steps 30, 32 and 34 respectively. An error report is the sorted and built and sent to a user as shown in steps 36 and 40. By way of example, but not of limitation, the report is sorted in the following order, input line number, field in error and the severity of the error.

Turning now to FIG. 2, there is shown one example of an input source file for use with the method 10 shown in FIG. 1. In a preferred embodiment, all input source files 20 have the following four sections, a template, SBS subsystem list, updates list and a spreadsheet table.

In accordance with the present invention, a language is developed and used in creating the input source file 20. This language supports the following lexemes:

Identifiers: An identifier may be any combination of alphanumeric characters up to 32 characters. The following characters are allowed to be in the word (case-insensitive): A–Z.0–9,@,4,5,7,_,<.>.?.

Keywords: A keyword is identifiers with specific meaning to the parser.

Numbers: Any positive/negative numeric value may be expressed here. A negative value must be preceded with a "–".

Boolean: A boolean begins with either a "T" or "F" value. "T" stands for TRUE (e.g. Multipilot is enabled), and "F" stands for false.

Enumeration: A set of identifiers that are expected within a field.

Comma Lists: A comma list is a list of one or more identifier. Each identifier in the list is separated by only one comma and any number of whitespace characters. A comma list may contain only one identifier; however, no comma is necessary.

Empty Comma List: The "*" is used to mark a field as containing an empty list.

Lexical escape: All records are read as line format. The "|" at the very end of a line is used for line continuation. Note, this is very important since the termination of a record coincides with the termination with the line of input. Also, this is really a lexical escape that preserves the subsequent character from having any meaning.

All of these sections may be interspersed with comments. Referring once again to FIG. 2, there are two types of comments:

END OF LINE: Ignores everything from "//" 42 to end of line.

MULTI-LINE-COMMENT: Ignore everything starting with "/*" and ending with "/*". This may (and may not) cross several lines.

Turning once again to FIG. 2, the template of the input source file 20 is now described in detail. The template begins with the keyword/NYCFx.x=, shown as 44. The "x.X" varies between releases, and it informs the current parser about the syntactic version of the file. A comma list of other keywords 46 follows this keyword. These keywords 46 define the expected columnar order of the values for each sector, and each keyword corresponds to one field in the record for a sector. The following is the list of keywords:

KEY: 32 character identifier to uniquely label the sector.

CELLNAME: 32 character identifier for the cell such: as MiniBTS8.

CELLID: Numeric value for the logical cell id.

BAND: Enumeration of 1900,800 or AMPS.

FREQ: Numeric value.

SECTOR: Enumeration of Alpha, Beta, Gamma, Omni.

MSCID_MKT: Numeric value describing the MSC Mkt Id.

MSCID_SWNO: Numeric value describing the MSC Switch Number.

BSCID: Numeric value describing the BSC.

PILOT: Number between 0–511.

NEIGHBORS: Comma list of keys describing each of the neighbors.

BORDERTARGET: Comma list of target cells for Border handoffs.

BEACONTARGET: Comma list of pairs target cells and pilot pns for Pilot Beacon handoffs.

EHHOTARGETCELL: Comma list of target cells for EHHO.

CELLTYPE: Enumeration Standard. Pilot_Beacon, EHHO, and Border.

PILOTINCR: Numeric value for the pilot increment in the neighbors list

The SBS list must by on the second line of input and defines all the SBS that exists for the system. As shown in FIG. 2, the following is the syntax 48: /SBS=list, wherein the list is a comma list of identifiers where each identifier is the name of the SBS table to update. The sector database may be quite sizeable. Therefore, an optional directive listing all of the sectors to update is present. This must follow both the template and the SBS list definitions. The syntax begins with the "/UPDATE=" keyword followed by a comma list of SECTORS (for example, /UPDATES= Dallas_8A,Dallas_8B.Dallas_8G.) All sectors will be updated/checked when this keyword is not present.

Referring once again to FIG. 2, the spreadsheet table consists of rows 50 and columns 52 wherein each column 52 is described by the template. A column 52 is a field within the sector record such as PILOT value, FREQUENCY, NEIGHBOR LIST, ETC. Each row 50 corresponds to a sector in the CDMA network. Each line of input is a row 50 and may have a lexical escape "\end-of-line" if the sector requires more than one line. The "key" 54 is an identifier used when referencing that sector in the database from another sector. This is necessary for both neighbor and target list support. Both of these lists are comma_list with identifiers that are keys 54 for other sectors.

Figure 3:
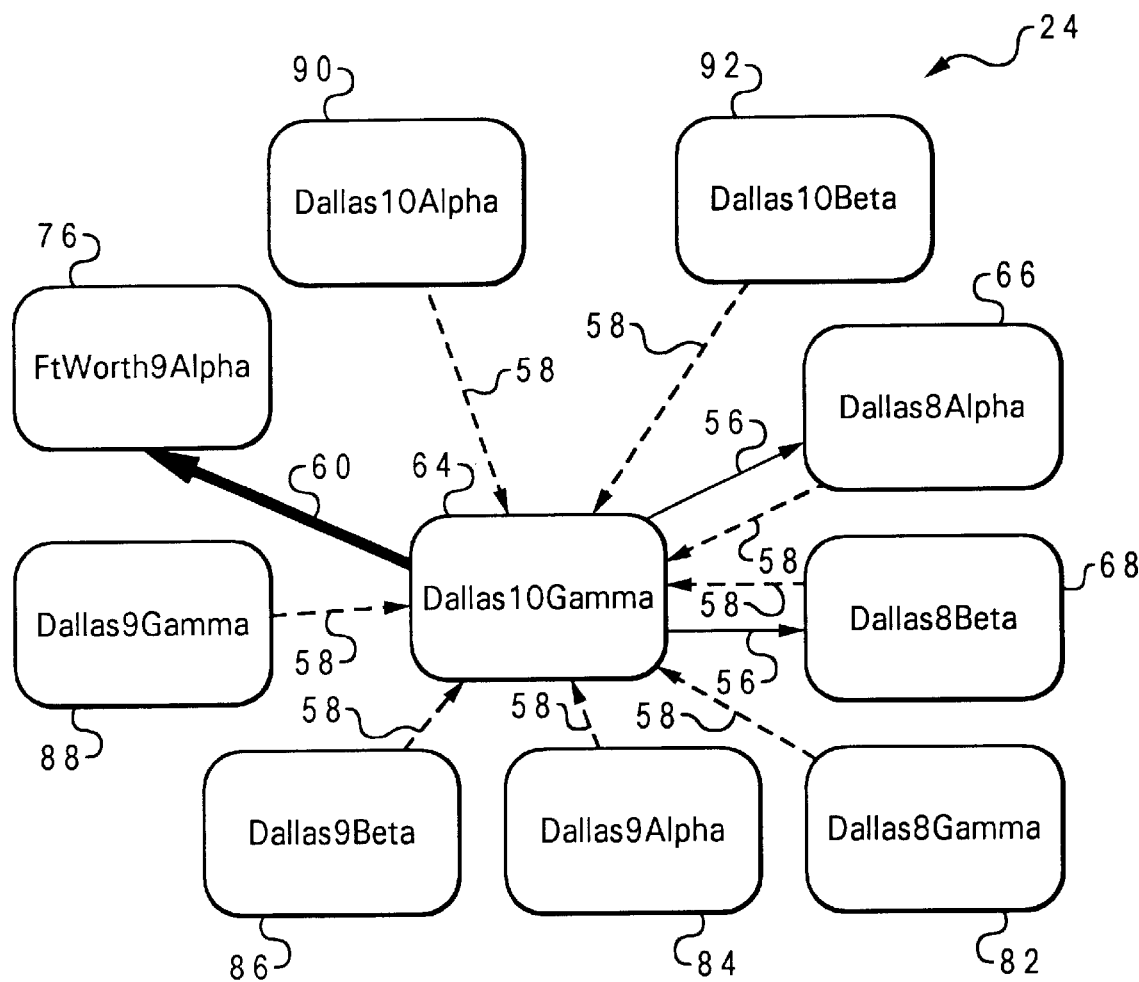
FIG. 3 is a directed graph built from the input source file shown in FIG. 2.

Referring now to FIG. 3, there is shown a directed graph 24 built from the input source file 20 of FIG. 2. As described above, a topology analyzer (not shown) parses the input source file 20 and builds the directed graph 24. For description purposes, a directed graph is a common computer science technique for describing topology relationships. As shown in FIG. 3, the graph is composed of nodes and arcs. A node is an entity in the model, and each arc describes a relationship between two nodes in the model. In this implementation, every node corresponds to one sector, and every sector is drawn in the graph 24.

Each node is implemented as a record containing fields, and each field corresponds to one column 52 in the table. Each arc describes a handoff relationship between two nodes with the following three types of arcs, neighbors who may soft/softer handoff into it 56, neighbors into which it may soft/softer handoff 58 and targets into whom it may hard handoff 60. Both targets and neighbor into which the node may handoff are determined directly by reading the input source file 20. Determining neighbors who may soft handoff into the sector are determined by iterating through the table, and drawing arcs, back to whichever nodes are in the sector's neighbor list, as shown in FIG. 3.

Referring now to FIG. 4, there is shown a directed graph 62 for analyzing 24 the neighbor list and target list for inconsistencies. For each sector in the table of the input source file 20, every arc in the neighbor list is walked, and the following comparisons are performed (but not limited to):

Frequencies must be identical.

Band (800 Mhz vs 1900 MHz) must be identical.

PILOT_PN values must be different, and a multiple of PILOTINCR.

No PILOT value should be repeated within this list.

Check for presence of the other two sectors in the same cell if this is a tri-sector cell.

For each sector in the table of the input source file 20, every arc in the target list is walked, and the following comparisons are performed:

Frequencies should be different.

Presence of target list when the sector type is either CELL_EHHO, CELL_BORDER, OR CELL_PiLOT_BEACON.

///

///

///

Below is one example of pseudo-code that may describe aforementioned search:

```
FOREACH sector in table
    FOREACH arc in list of neighbor list
        COMPARE sector to arc.destinationNode.sector
    ENDFORE
    FOREACH arc in list of targets
        COMPARE sector to arc,destinationNODE.sector
    ENDFORE
ENDFOR
```

All error messages about inconsistencies are stored in the report object that reports the errors later as will be more fully described below. Referring once again to FIG. 4, "Dallas10Gamma" 64 has two neighbors, "Dallas8Alpha" 66 and "Dallas8Beta" 68 as shown by the "soft handoff into" arc 56 and "soft handoff from" arc 58. As shown in the summary tables, 70, 72 and 74 of FIG. 4, the frequencies and bands are identical, and the PILOT_PN values are different and a multiple of the PILOTINCR. However, an error is detected because Dallas10Gamma 64 does not have in its table 70, "Alpha" and "Beta" sectors for its cellId 10. Also, "Dallas10Gamma" 64 has one entry in its target list, "FTWorth9Alpha 76 as shown by "hard handoff into" arc 78. An error is detected because as shown in tables 70 and 80, for "FTWorth9Alpha" 76 and "Dallas10Gamma" 64 have the same frequencies. Therefore a user should be advised to place "FTWorth9Alpha" 76 in the neighbor list, if possible.

Turning back to FIG. 3 and referring to the input source file 20 of FIG. 2, an example of analyzing neighbors to be mutually inclusive is shown. That is, checking that Sector #1 should be in sector #2's neighbor list if Sector #1 contains Sector #2 in its neighbor list. For each sector in the table of the input source file 20, every arc in the neighbor list is walked. Then, within this inner comparison, every arc in the list of sectors that may handoff into this sector is walked. The iteration stops once the match is found. If no match is found within the list, an error message is stored in the report object. The following is an example of pseudo-code for performing this operation:

```
FOREACH sector in table
    FOREACH ARC in neighbor list
        FOREACH arc in list of neighbor who may handoff into it
            COMPARE sector to arc.destination Node.sector
    ENDFOR
        IF no match
        THEN
            Report Error
        ENDIF
    ENDFOR
ENDFOR--
```

As shown in FIG. 3, the neighbor list for "Dallas10Gamma" 64 should contain "Dallas8Gamma" 82, "Dallas9Alpha" 84, "Dallas9Beta" 86, "Dallas9Gamma" 88, "Dallas10Alpha" 90, and "Dallas10Beta" 92. All of those do contain "Dallas10Gamma" 64 in their respective neighbor lists.

Figure 5:
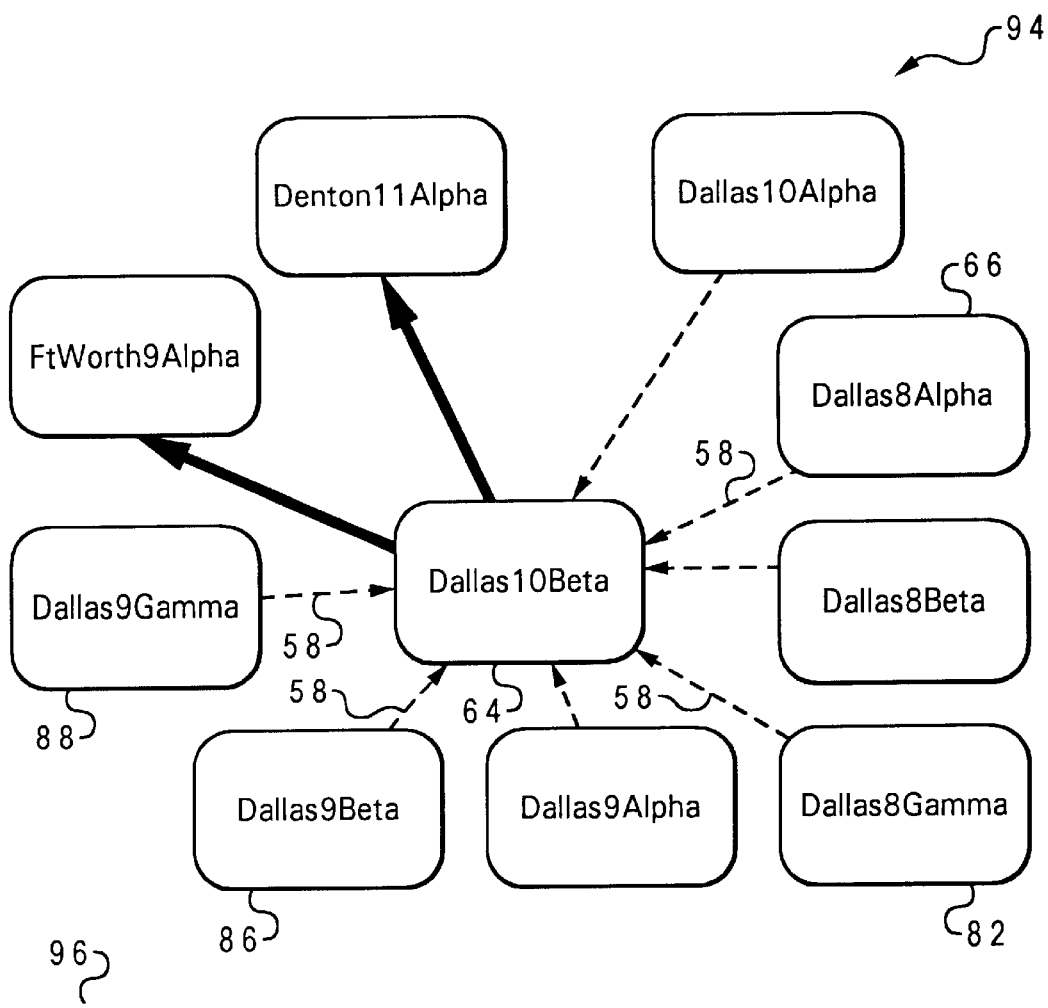
FIG. 5 is a directed graph for analyzing pilot beacon target lists.

Referring now to FIG. 5, there is shown a directed graph 94 for analyzing a Pilot Beacon Target List 96. The Pilot Beacon Target List 96 is unique because it has the following fields:

Pilot_PN: The PILOT value for the neighbor handing into it

TargetList: A list of targets for that PILOT only.

A call will drop or disconnect if the PILOT_PN of the neighbor handing into the PILOT BEACON sector is not found in the target list. For each PILOT BEACON sector in the table, every arc in the list of neighbors that may handoff into is walked. Then, within this inner comparison, every entry in the PILOT BEACON target list is walked. The search stops on the first match of the two PILOT PN values. An error message is reported if no match is found. The following is an example of pseudo-code for performing this operation:

```
FOREACH sector in table
    If sector_type=PILOT_BEACON
    FOREACH arc in list of neighbor who may handoff into it
        FOR each entry in the PILOT BEACON Target List of the
        sector
            COMPARE TargetLIst.Entry.PILOT_PN
            to arc.destinationNode.sector.PILOT_PN
        ENDFOR
        IF no match
        THEN
            Report Error
        ENDIF
```

-continued

```
        ENDFOR
    ENDIF
ENDFOR
```

As shown by FIG. 5, an error is detected. The target list of "Dallas10Beta" 64 does not contain the PILOT_PN values of sectors that may hand into it. More specifically, Dallas8Alpha (80) 66, Dalla8Gamma(88) 82, Dallas9Beta (96) 86, and Dallas9Gamma(100) 88 can soft handoff into it. The PILOT values in (80, 88, 96, and 100) need to be in the PILOT BEACON Target List 96 as shown in the input source file 20.

Turning once again to FIG. 3 and the input source file 20 of FIG. 2, there is shown an example whether a sector dominates a sector upon entry. Sector entry dominators are not necessarily incorrect; however they can lead to wasted capacity because no one may be handing into the sector. For each sector in the table, every arc in the list of neighbors that may handoff into it is counted. An error message is reported if the size is less than or equal to one. The following is an example of pseudo-code for performing this operation:

```
FOREACH sector in table
    COUNT: = 0
    FOREACH arc in list of neighbor who nay into it
        COUNT: = COUNT+1
    ENDFOR
    IF COUNT<=1
    THEN
        Report Error
    ENDIF
ENDFOR
```

FIG. 3 has no sector entry dominators because 8 sectors may hand into "Dallas10Gamma" 64.

FIG. 3 also describes how to see whether a cell dominates a sector. Cell entry dominators are not incorrect; however they can lead to wasted capacity. For each sector in the table, every arc in the neighbors that may handoff into it is walked. An error message is reported if all of the arcs have the same CELL ID. The following is an example of pseudo-code for performing this operation:

```
FOREACH sector in table
    CELL:=sector.list_neighbor who may hand into .
    first arc.dest_node.cell
    CELL_ENTRY_DOMINATOR:=TRUE
    FOREACH arc in list of neighbor who may into it
        IF sector.cell^=arc.node.cell
        THEN
            CELL_ENTRY_DOMINATOR: = FALSE
        ENDIF
    ENDFOR
    If CELL_ENTRY_DOMINATOR
    THEN
        Report Error
    ENDIF
ENDFORE
```

FIG. 3 has no cell entry dominators because 3 cells may hand into "Dallas10Gamma" 64.

FIG. 3 also contains an example of verifying sector entry dominators. Sector entry dominator can lead to dropped calls when there is an outage in the dominating cell. For each sector in the table, every arc in the neighbor list is walked. An error message is reported if all of the arcs have the same CELL ID. The following is an example of pseudo-code for performing this operation:

```
FOREACH sector in table
    COUNT: = 0
    FOREACH arc in neighbor list
        COUNT: = COUNT+1
    ENDFOR
    IF COUNT<=1
    THEN
        Report Error
    ENDIF
ENDFOR--
```

FIG. 3 has no errors because "Dallas10Gamma" 64 has two sectors into which it may handoff.

Lastly FIG. 3 contains an example to verify whether a cell dominates a sector on exit. Cell entry dominators are not incorrect; however they can lead to dropped calls when there is an outage in the dominating cell. For each sector in the table, every arc in the neighbor list is walked. An error message is reported if all arcs have the same CELL ID. The following is an example of pseudo-code for performing this operation:

```
FOREACH sector in table
    CELL: = sector.neighbor_list.first arc.dest_node.cell
    CELL_EXIT_DOMINATOR: = TRUE
    FOREACH arc in neighbor list
        IF sector.cell^=arc,node.cell
        THEN
            CELL_EXIT_DOMINATOR: = FALSE
        ENDIF
    ENDFOR
```

In FIG. 3, an error is detected here because Cell 8 dominates the "Dallas10Gamma" 64.

Figure 6A:
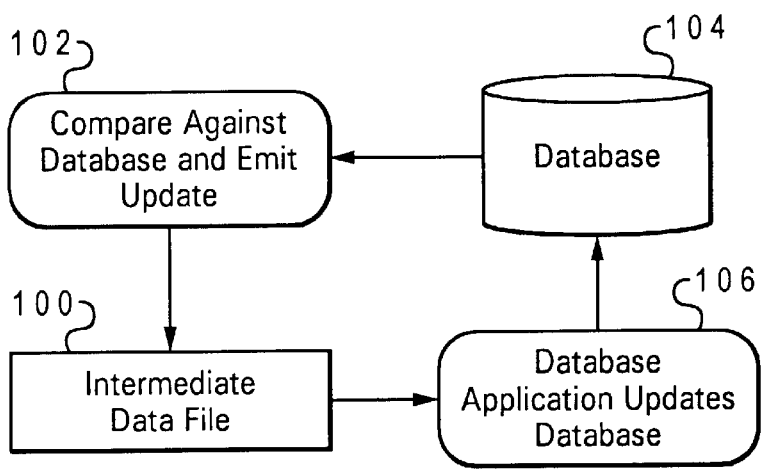
FIG. 6A is a high a high-level flowchart for updating a CDMA database in accordance with the present invention.
Figure 6B:
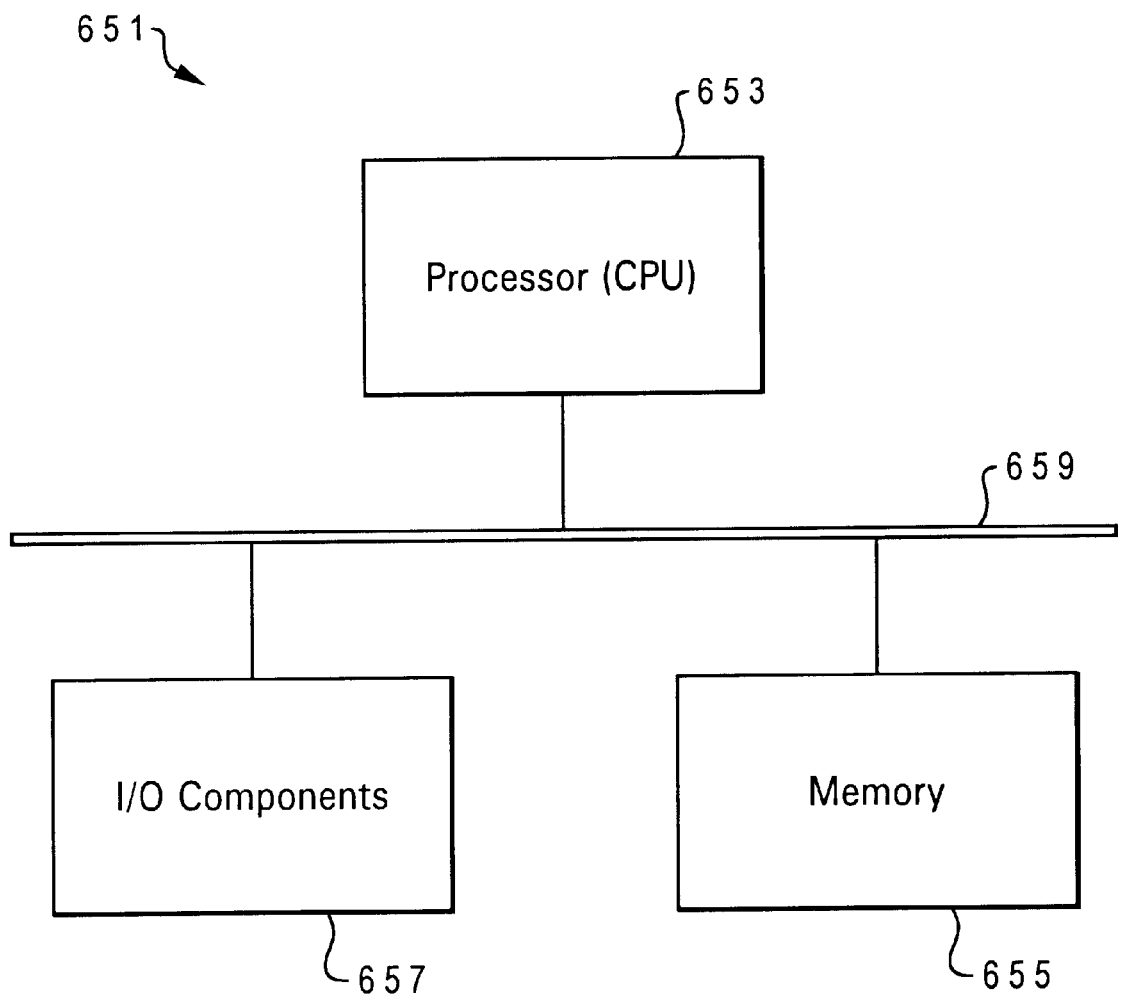
FIG. 6B illustrates a data processing system with which the various processes of the invention including those described in FIG. 6A are implemented.

Referring now to FIG. 6A, an intermediate file 100 is emitted by the topology analyzer. This file is organized into two sections; Base Transceiver Subsystem Info and SBS relevant info. The information is then compared, as shown in block 102 against the respective tables in the database 104 system. The database application then updates the database 106. Referring to FIG. 7, after all of the analyses is done, a report 98 can be rendered to the user. Error messages are stored in the report object during all phases of analysis. Then, the messages are sorted by the corresponding line number in the input source file 20. Thus the user can more easily scan the input source file 20 while comparing the results.

While the invention has been particularly shown and described with reference to a preferred embodiment, it will be understood by those skilled in the art that various changes in form and detail may be made therein without departing from the spirit and scope of the invention.

What is claimed is:

1. A method for verification of both neighbor and target lists in a CDMA network, said method comprising:

creating an input source file from user input for defining a design layout of a CDMA network;

performing topology analysis during network configuration to parse said input source file and build a directed graph from said input source file of said CDMA network design layout;

analyzing both neighbor and target lists using said directed graph for inconsistencies resulting in errors that will lead to dropped calls;

sorting and building an error report; and utilizing said error report to correct said neighbor and target lists so that improved signal connection is provided for a mobile terminal moving across a geographical area covered by said CDMA network.

2. The method of claim 1, further comprising:

analyzing mutually inclusive neighbors using said directed graph for said errors that will lead to dropped calls wherein said errors are included in said error report.

3. The method of claim 1, further comprising:

analyzing PILOT BEACON target lists using said directed graph for said errors that will lead to dropped calls wherein said errors are included in said error report.

4. The method of claim 1, further comprising:

analyzing sector entry dominators using said directed graph for said errors that will lead to dropped calls wherein said errors are included in said error report.

5. The method of claim 1, further comprising:

analyzing cell entry dominators using said directed graph for said errors that will lead to dropped calls wherein said errors are included in said error report.

6. The method of claim 1, further comprising:

analyzing cell exit dominators using said directed graph for said errors that will lead to dropped calls wherein said errors are included in said error report.

7. The method of claim 1, further comprising:

creating said input source file having a template, SBS subsystem list, updates list and a spreadsheet table.

8. The method of claim 1, further comprising:

analyzing said inconsistencies for frequency, band class and pilot value errors that will lead to dropped calls wherein said errors are included in said error report.

9. The method of claim 1, said creating step further comprising:

defining a language for creating said input source file; and utilizing said language to enable entry of data associated with a proposed configuration of said CDMA network to include input neighbor and target data within said input source file.

10. A system for verification of both neighbor and target lists in a CDMA network comprising:

means for creating an input source file from user input for defining a design layout of a CDMA network;

means for parsing said input source file and building a directed graph having nodes and arcs from said input source file of said CDMA network design layout;

means for analyzing both neighbor and target lists using said directed graph for inconsistencies resulting in errors that will lead to dropped calls;

means for sorting and building an error report; and means for utilizing said error report to correct said neighbor and target lists so that improved signal connection is provided for a mobile terminal moving across a geographical area covered by said CDMA network.

11. The system of claim 10, further comprising:

means for analyzing mutually inclusive neighbors using said directed graph for said errors that will lead to dropped calls wherein said errors are included in said error report.

12. The system of claim 10, further comprising:

means for analyzing PILOT BEACON target lists using said directed graph for said errors that will lead to dropped calls wherein said errors are included in said error report.

13. The system of claim 10, further comprising:

means for analyzing sector entry dominators using said directed graph for said errors that will lead to dropped calls wherein said errors are included in said error report.

14. The system of claim 10, further comprising:

means for analyzing cell entry dominators using said directed graph for said errors that will lead to dropped calls wherein said errors are included in said error report.

15. The system of claim 10, further comprising:

means for analyzing cell exit dominators using said directed graph for said errors that will lead to dropped calls wherein said errors are included in said error report.

16. The system of claim 10, further comprising:

means for creating said input source file having a template, SBS subsystem list, updates list and a spreadsheet table.

17. The system of claim 10, further comprising:

means for analyzing said inconsistencies for frequency, band class and pilot value errors that will lead to dropped calls wherein said errors are included in said error report.

18. The system of claim 10, said means for creating further comprising:

means for defining a language for creating said input source file; and means for utilizing said language to enable entry of data associated with a proposed configuration of said CDMA network to include input neighbor and target data within said input source file.

19. A method for verification of both neighbor and target lists in a CDMA network comprising:

creating an input source file for defining the layout of a CDMA network;

performing topology analysis to parse and build a directed graph from said input source file of said CDMA network;

analyzing both neighbor and target lists using said directed graph for inconsistencies resulting in errors that will lead to dropped calls;

analyzing mutually inclusive neighbors and PILOT BEACON target lists using said directed graph for said errors;

analyzing sector entry, cell entry and cell exit dominators using said directed graph for said errors;

sorting and building an error report; and generating and outputting an output file for utilization as said neighbor and target lists within a database of said CDMA network.

20. The method of claim 1, wherein:

said performing, analyzing, and sorting steps are dynamically completed via program code executing on a processor of a data processing system, which takes as its input said input source file.

21. The method of claim 1, further comprising of generating and outputting an output file for utilization as said neighbor and target lists within a database of said CDMA network.

22. The system of claim 10, further comprising means for generating and outputting an output file for utilization as said neighbor and target lists within a database of said CDMA network.

23. A data processing system comprising:

a processor;

input and output (I/O) components; and program code executing on said processor for enabling verification of both neighbor and target lists in a CDMA network, said program code comprising code for:

generating an input source file from user input for defining the layout of a CDMA network;

performing topology analysis to parse and build a directed graph from said input source file of said CDMA network;

analyzing both neighbor and target lists using said directed graph for inconsistencies resulting in errors that will lead to dropped calls;

analyzing mutually inclusive neighbors and PILOT BEACON target lists using said directed graph for said errors;

analyzing sector entry, cell entry and cell exit dominators using said directed graph for said errors;

sorting and building an error report;

creating an output file for utilization as said neighbor and target lists within a database of said CDMA network; and outputting said error report and said output.

\* \* \* \* \*